June 11, 1946.  R. L. ANDERSON  2,402,007
COMBINE FOR GARBONZA AND LIKE CROPS
Filed Nov. 16, 1942  3 Sheets-Sheet 1

INVENTOR
Ralph L. Anderson
BY
ATTORNEYS

June 11, 1946.    R. L. ANDERSON    2,402,007
COMBINE FOR GARBONZA AND LIKE CROPS
Filed Nov. 16, 1942    3 Sheets-Sheet 2
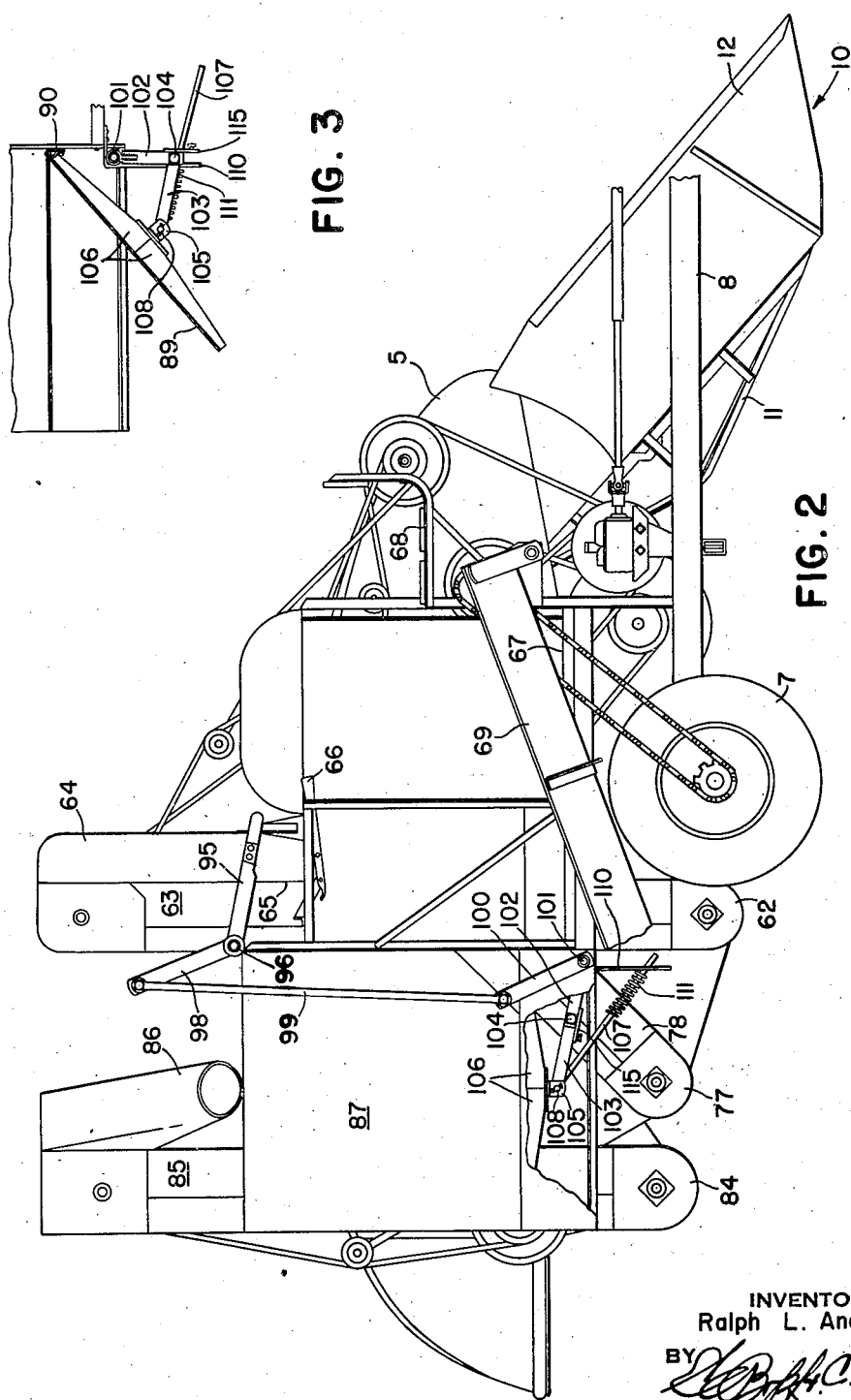
INVENTOR
Ralph L. Anderson
BY
ATTORNEYS INVENTOR
Ralph L. Anderson
BY
ATTORNEYS Patented June 11, 1946

2,402,007

UNITED STATES PATENT OFFICE 2,402,007

COMBINE FOR GARBONZA AND LIKE CROPS

Ralph L. Anderson, Moline, Ill., assignor to Deere & Company, Moline, Ill., a corporation of Illinois Application November 16, 1942, Serial No. 465,778

7 Claims. (Cl. 130—27)

The present invention relates generally to harvester threshers, otherwise known as combines, and more particularly to combines for harvesting garbonza and other special crops. Garbonza is a crop which is usually planted in rows and grows in the form of a low vine having pods containing seeds which resemble beans. The plants are usually severed just below the ground surface by means of sharpened spades and the vine is then turned over to permit the pods, which grow on the vines beneath the leaves, to dry in the sun. After the crop is dried, it is threshed and the beans are separated and placed in sacks, while the pods, being valuable as feed, are desirable to save for such purposes.

The conventional combine, such as for example is shown in a co-pending application, Serial No. 348,128, filed July 29, 1940, by Anderson, Arnold and Paradise, is not entirely suitable for harvesting crops of this type, for the reason that it is impossible, with such conventional machine, to save the pods for feed. In the conventional combine, the grain or beans are separated from the pods by the separator shoe, while the pods are discharged over the end of the finger grate upon the ground and are scattered so that they are not reclaimable.

The principal object of this invention, therefore, relates to the provision of an attachment for a combine, which will provide for not only separating the beans from the pods, but will also provide for separating the unthreshed pods, conveying the latter back to the cylinder for rethreshing, and cleaning the threshed pods and accumulating the latter so that they may be saved for feed. A further object of this invention has to do with the provision of a receptacle for collecting the threshed pods, the receptacle being provided with means for dumping an accumulation of pods in a pile on the ground or into a suitable receiver for the same. Still another object relates to the provision of control means for controlling the dumping of the receptacle by means of a lever located within convenient reach of the operator of the sacking mechanism upon the sacking platform of the combine.

These and other objects and advantages of my invention will be apparent to those skilled in the art after a consideration of the following description, in which reference is had to the drawings appended hereto, in which Figure 1 is a fragmentary plan view of a combine equipped with a device embodying the principles of my invention;

Figure 2 is a side elevational view of the combine, a part being broken away to show the details of the dumping control mechanism;

Figure 3 is a fragmentary side elevational view of the lower portion of the receptacle and dumping mechanism, showing the receptacle in dumping position.

Figure 1:
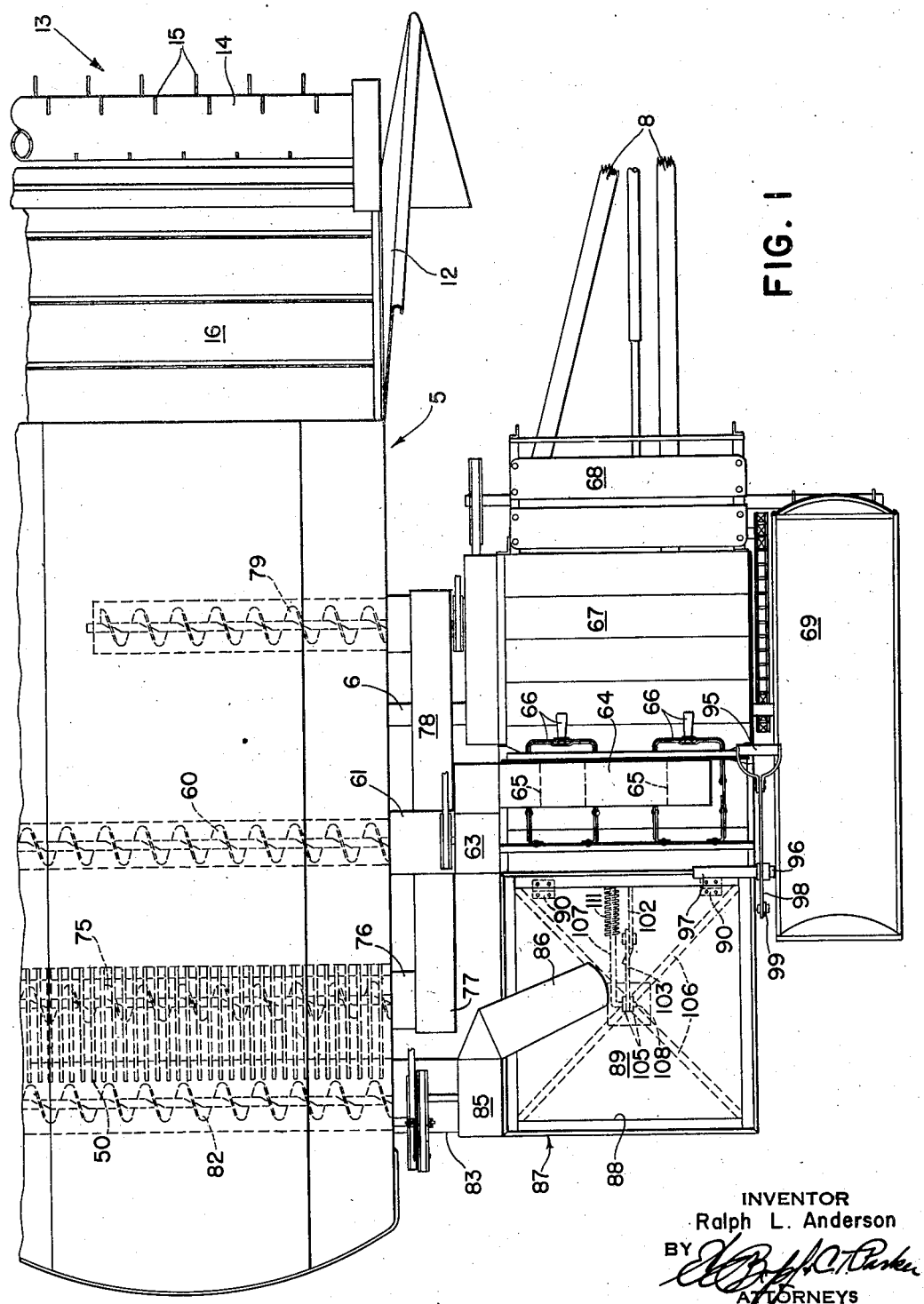
Figure 4:
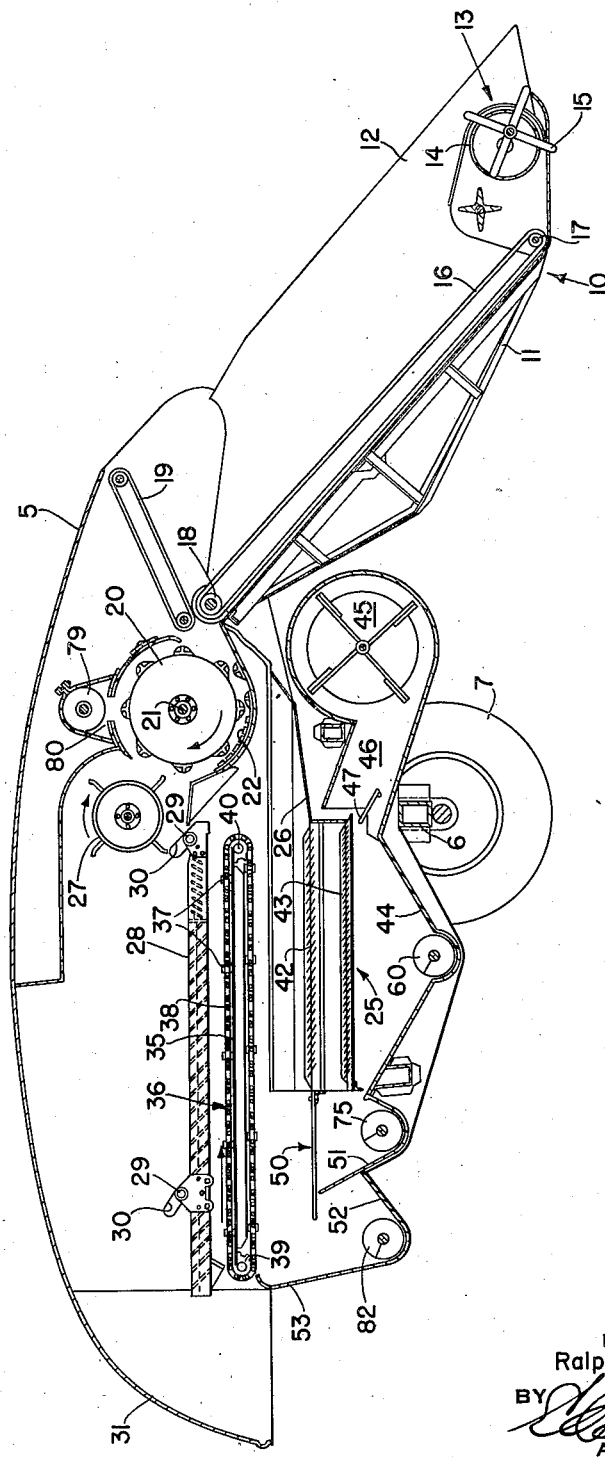
Figure 4 is a longitudinal sectional elevation taken through the combine.

Referring now to the drawings, the combine is generally of the type disclosed in my above-identified co-pending application, and comprises a longitudinally extending thresher body 5 mounted on a mobile frame including a transverse axle beam member 6, the latter being supported at opposite ends thereof on a pair of ground wheels 7, and further including a forwardly extending draft frame comprising a pair of forwardly converging beams 8 adapted to be supported at their forward ends on the drawbar of a tractor or other draft device.

A harvester platform 10 is pivotally mounted on the forward end of the thresher body 5 on a transverse axis and extends forwardly therefrom in a normally downwardly inclined position. The platform 10 includes a structural framework 11 and a pair of vertical side walls 12, and supports, across its forward end, a pick-up device 13, preferably of the type comprising a cylinder 14 having generally radially extending fingers 15, which engage the crop on the ground and are retracted into the cylinder as the latter rotates upwardly and rearwardly to deposit the crops on the platform. The pick-up device can be of any conventional design and is no part of the present invention, and therefore further description is considered unnecessary. The platform 10 is also provided with an endless type conveyor comprising a flexible endless belt 16 trained over a lower roller 17 and an upper roller 18, the latter being rotatably supported on the axis of vertical swinging movement of the platform in the usual manner. A short upper feeder conveyor 19 is provided above the upper end of the platform conveyor 16 and assists in feeding the plants into the threshing cylinder 20. The threshing cylinder 20 is mounted on a transverse shaft 21 which is journaled in opposite side walls of the thresher body 5 and cooperates with a more or less conventional concave 22 supported in the body beneath the threshing cylinder 20. The action of the cylinder 20 removes the pods from the vines and also cracks open the pods, thereby releasing the beans, which drop through the concave upon a shoe 25, which is provided with a pan 26 extending forwardly beneath the concave 22. The vines are stripped from the cylinder 20 by means of a beater 27, which is disposed transversely immediately behind the cylinder 20 and is rotatable in the direction indicated by the arrow.

The vines are tossed by the beater 27 upon a rearwardly extending straw rack 28, which is supported on a pair of front and rear transverse shafts 29, which reciprocate within inclined slots 30 in the side walls of the thresher body 5. The mechanism for reciprocating the straw rack is not shown in detail, for any conventional mechanism can be used for this purpose, which is to shake the vines and at the same time propel them rearwardly and discharge them off the rear end of the straw rack, allowing them to drop through a downwardly turned hood portion 31 on the rear of the body 5.

Due to the shaking action of the straw rack 28, any pods or beans that are mixed with the vines are shaken downwardly through the rack and are caught upon an imperforate horizontal pan 35, which is coextensive with the straw rack and is provided with a flexible endless conveyor 36 provided with transverse slats 37 attached at opposite ends thereof to a pair of conveyor chains 38. The chains 38 are trained over a pair of sprockets 39, 40 at opposite ends of the pan 35 and the forward sprocket 40 is provided with driving means (not shown) for propelling the upper flight of the conveyor in a forward direction as indicated by the arrow, to cause the slats 37 to sweep the pods and beans forwardly over the forward edge of the pan 35 and deposit them upon the shoe 25 adjacent the forward end thereof. The shoe includes the usual sieves or screens 42 and 43 of any suitable conventional construction, through which the beans drop into a grain trough 44 beneath the shoe. A fore and aft reciprocating movement of the shoe is imparted by a mechanism not shown but which is more fully described in the co-pending application mentioned above. By this reciprocating movement of the shoe, the pods are tossed rearwardly along the sieves, while the dirt and light chaff is separated from the pods and beans by means of an air blast created by a fan 45 having an exhaust duct 46 inclined upwardly and rearwardly at the forward end of the sieves, the amount of air being controlled to a certain extent by means of a damper 47 in the exhaust duct.

A finger grate 50 is mounted on the rear end of the shoe substantially on a level with the upper sieve 42 and consists of a plurality of laterally spaced longitudinally extending fingers supported at their forward ends on the shoe and unsupported at their rearward ends. The fingers are spaced approximately $\frac{7}{16}$ or ½ inch apart, which is slightly wider spacing than is used in harvesting small grains. I have found that the weight of the unthreshed pods is sufficiently heavier than that of the threshed pods, that the unthreshed pods are shaken to the bottom of the pile of pods on the upper sieve 42 and on the finger grate 50 and drop through the latter into the tailings trough 51. The threshed pods are so light in weight that the strength of the air blast from the fan 45 tends to prevent them from falling through the sieve 42 and through the finger grate 50 so that they pass over the rear ends of the fingers 50 into a third trough 52 disposed behind the tailings trough 51. Some of the unthreshed pods will drop through the upper sieve 42 upon the lower sieve 43, which is finer than the upper, and thus those unthreshed pods are propelled rearwardly along the lower sieve 43 and are also discharged into the tailings trough 51. The rear trough 52 has a high rear wall 53, over which the air blast passes through the rear end of the conveyor 36 and carries the dirt and light chaff over the rear wall 53 and is directed by the hood 31 to the ground behind the machine.

The grain trough 44 is provided with a transverse auger 60 rotatably disposed in the bottom of the trough 44 for moving the beans laterally and through a conduit 61 into a lower boot 62 of an elevator 63. Beans are raised by the elevator 63 and are discharged into a conduit 64 provided with a pair of sacking spouts 65, each of which has a sack holder 66 associated therewith for supporting the open sacks beneath the spouts 65, in a manner well-known to those skilled in the art. A platform 67 is provided for the operator who attends to filling the sacks, and also a seat 68. A usual sack chute 69 is supported at the side of the platform 67, for conveying the filled sacks to the ground.

The unthreshed pods which drop between the fingers of the grate 50 and which are discharged from the end of the lower sieve 43, are received by the tailings trough 51, and are conveyed therefrom by means of an auger 75 which is rotatably disposed in the bottom of the trough 51. The auger 75 conveys the unthreshed pods laterally through a conduit 76 into the boot 77 of the tailings elevator 78, which raises the tailings and discharges them into an upper transversely disposed auger conveyor 79, which discharges the tailings through an opening 80 above the threshing cylinder 20, thus causing the unthreshed pods to be subjected to another threshing operation.

The pieces of threshed garbonza pods are light in weight and are carried over the sieves and finger grate 50 and are discharged over the rear end of the fingers into the rear trough 52. The air blast aids in preventing the threshed pods from dropping into the tailings trough 51. The pods are conveyed laterally through the trough 52 by means of an auger 82, which extends through a transverse conduit 83 into an elevator boot 84 at the lower end of a vertical elevator 85. The latter raises the pods and discharges them into a chute 86, which directs the pods into a receptacle in the form of a bin 87, which is mounted on the combine directly behind the sacking operator's platform 67.

The entire bottom of the bin 87 has an opening 88 which is closed by a bottom panel or door 89, the latter being pivotally mounted on a pair of hinges 90 at its forward edge, providing for downward swinging movement about the axis of the hinges into a downwardly and rearwardly inclined position as shown in Figure 3. As mentioned above, it is desirable to allow the pods to accumulate and to dump accumulations of pods in piles on the ground during operation. By swinging the entire bottom of the bin downwardly, the entire bin of pods can be instantaneously deposited upon the ground as the combine moves forwardly, and thus is not strewn along the ground but is maintained in a pile which can be easily loaded into a wagon or truck. This dumping operation is controlled by the sacking operator by means of a control lever 95, which extends alongside the platform 67 in a convenient location and is swingably mounted on a pivot bolt 96, which is journaled in a pipe 97 welded on the forward edge of the bin 87. An arm 98 is fixed to the lever 95 and extends upwardly and rearwardly from the pivot 96 and is connected by a vertical link 99 with an arm 100 mounted rigidly on a rockshaft 101, which is disposed transversely beneath the bin and is journaled in the lower portions of the side walls of the bin. The rockshaft 101 is connected to the bottom panel or door 89 by means of a pair of toggle links 102, 103. The link 102 is rigidly fixed to the rockshaft 101 and is connected to the link 103 by a pivot 104. The other end of the upper link 103 is swingably mounted on a bracket 105, which is fixed at the center of an X frame 106 on the bottom of the door 89. A rod 107 has its upper end turned at right angles to form a pivot pin 108 for the link 103, and the rod 107 extends downwardly and forwardly through an aperture in a vertical bracket 110, which is rigidly mounted on the bottom of the platform 67. A compression spring 111 is coiled about the rod 107 and bears against the bracket 110. This spring acts as a buffer when the door swings downwardly to absorb the shock and prevent damage to the door and other parts.

When the lever 95 is in its lowest position, the pivot bolt 104 is in a position slightly above a straight line interconnecting the rockshaft 101 with the pivot 108. Further upward movement of the bolt 104 is prevented by a stop lug 115 fixed to the lower link 102 and extending under the lower portion of the link 103 to support the latter, thus providing an over-center toggle lock for holding the door 89 in closed position. The door is readily and quickly opened by swinging the lever 95 upwardly, thereby acting through the link 99 to swing the arm 100 on the rockshaft 101 downwardly in a counterclockwise direction as viewed in Figure 2. This swings the pivot bolt 104 downwardly, breaking the toggle, and swinging the door 89 downwardly about its hinge connections 90. As the door swings downwardly the rod 107 slides through the bracket 110 until the upper end of the rod encounters the spring 111, which cushions the opening of the door. After the pods have dropped to the ground, the door is reclosed by swinging the lever 95 downwardly to its original position.

I claim:

1. In a combine for harvesting garbonza and the like having a threshing cylinder, the combination of a straw rack adapted to separate grain and pods from straw and discharge the latter to the ground, a separator shoe, a finger grate mounted on the discharge end of said shoe, a tailings trough disposed under said grate, means for conveying tailings from said trough to said cylinder for rethreshing, a trough disposed at the end of said grate to receive pods and the like therefrom, a receptacle for collecting said pods, a bottom door hingedly supported thereon to swing to a downwardly and rearwardly inclined position to discharge an accumulation of pods or the like during operation, and means for conveying said pods from said trough to said receptacle.

2. In a combine for harvesting garbonza and the like having a threshing cylinder, the combination of a straw rack adapted to separate grain and pods from straw and discharge the latter to the ground, a separator shoe, a finger grate mounted on the discharge end of said shoe, a tailings trough disposed under said grate, means for conveying tailings from said trough to said cylinder for rethreshing, a trough disposed at the end of said grate to receive pods and the like therefrom, a receptacle for collecting said pods, a bottom door hingedly supported thereon to swing to a downwardly and rearwardly inclined position to discharge an accumulation of pods or the like during operation, means for locking said bin door in closed position, a lever mounted on said combine and connected with said locking means for opening and closing said door, and means for conveying said pods from said trough to said receptacle.

3. In a combine for harvesting garbonza and the like having a threshing cylinder, the combination of a straw rack adapted to separate grain and pods from straw and discharge the latter to the ground, a separator shoe, a finger grate mounted on the discharge end of said shoe, a tailings trough disposed under said grate, means for conveying tailings from said trough to said cylinder for rethreshing, a trough disposed at the end of said grate to receive pods and the like therefrom, a receptacle for collecting said pods, a bottom door hingedly supported thereon to swing to a downwardly and rearwardly inclined position to discharge an accumulation of pods or the like during operation, means for locking said bin door in closed position comprising a rockshaft journaled adjacent said bin, a pair of links connecting said rockshaft with said bin door and movable into a dead center locking position to secure said door in closed position, a control member connected to said rockshaft and extending to a remote position, for opening and closing said door, and means for conveying said pods from said trough to said receptacle.

4. In a combine for harvesting garbonza and the like, having a threshing cylinder, the combination of a straw rack adapted to separate grain and pods from straw and discharge the latter to the ground, a separator shoe, a grain trough under said shoe, a sacking platform on said combine, means for conveying grain from said trough to said sacking platform, a finger grate mounted on the end of said shoe, a tailings trough disposed under said grate, means for conveying crop material that falls through said finger grate into said tailings trough from the latter to said threshing cylinder, a third trough disposed under the end of said finger grate to receive pods and the like therefrom, a receiving bin on said combine, means for conveying pods and the like from said third trough to said bin, the latter having a discharge door in the lower portion thereof, a lever mounted adjacent said sacking platform convenient to an operator thereon, and means connecting said lever with said door providing for controlling the latter from the sacking platform to permit accumulated pods to be deposited in piles on the ground.

5. In a combine for harvesting garbonza and the like, having a threshing cylinder, separating apparatus comprising, in combination, a straw rack for separating straw from threshed pods, unthreshed pods, and grain, and adapted to separately discharge said straw, a separating shoe disposed to receive threshed pods, unthreshed pods and grain from said straw rack, said shoe comprising an upper sieve adapted to retain pods and pass grain therethrough, a lower sieve of finer mesh than said upper screen disposed beneath the latter and adapted to pass grain therethrough but retaining any pods or partially threshed pods that may pass through said upper sieve, and a finger grate mounted on the discharge end of said upper sieve for receiving pods therefrom and adapted to pass unthreshed pods therethrough, said shoe being reciprocative to cause said unthreshed pods to gravitate to the bottom of the pile on said upper sieve and pass through said finger grate and to urge pods toward the discharge ends of both screens, means for directing an air blast upwardly against said finger grate to restrain the light threshed pods from passing through the latter with the heavier unthreshed pods, a trough disposed at the discharge end of said lower sieve and beneath said finger grate for collecting pods from said lower screen and grate, means in said trough for conveying said pods to said threshing cylinder, and separate collecting means disposed beneath said lower screen and beyond the end of said grate for separately collecting grain and threshed pods, respectively, said means for collecting threshed pods having a wall serving as a shield between the end of said finger grate and the end of said straw rack and serving to exclude the straw from the collected threshed pods.

6. In a combine for harvesting garbonza and the like, having a threshing cylinder, separating apparatus comprising, in combination, a straw rack for separating straw from threshed pods, unthreshed pods, and grain, and adapted to separately discharge said straw, sieve means disposed beneath said straw rack for receiving said threshed pods, unthreshed pods and grain therefrom, said sieve means being adapted to retain threshed and unthreshed pods and pass grain therethrough, a trough beneath said sieve for collecting said grain, a finger grate mounted on the discharge end of said sieve for receiving pods therefrom and adapted to pass unthreshed pods therethrough, said grate being reciprocative for causing said unthreshed pods to gravitate to the bottom of the pile and pass through said grate, means for restraining the threshed pods from passing through said grate with said unthreshed pods, a trough beneath said grate to collect the unthreshed pods, means for conveying the latter to said threshing cylinder, a trough at the discharge end of said finger grate for separately collecting the threshed pods discharged therefrom and adapted to exclude straw discharged from said straw rack, a receiving bin mounted on said combine, and means for conveying said threshed pods from said trough to said bin, the latter being provided with a door movable to an open position to discharge said threshed pods.

7. In a combine for harvesting garbonza and the like, having a threshing cylinder, the combination of a straw rack adapted to separate grain and pods from straw and discharge the latter to the ground, a separator shoe, a finger grate mounted on the discharge end of said shoe, a tailings trough disposed under said grate, means for conveying tailings from said trough to said cylinder for rethreshing, a trough disposed at the end of said grate to receive pods and the like therefrom, a receptacle for collecting said pods, a bottom door hingedly supported thereon to swing to an open position to discharge an accumulation of pods or the like during operation, and means for conveying said pods from said trough to said receptacle.

RALPH L. ANDERSON.